United States Patent Office 3,481,025
Patented Dec. 2, 1969

3,481,025
METHOD AND APPARATUS FOR REINFORCING THE WALLS OF WELDED PIPES OR OTHER TUBULAR ELEMENTS
Vilem Eckhardt, Paris, France, assignor to Driam AG, Zurich, Switzerland
Filed Mar. 27, 1967, Ser. No. 626,314
Int. Cl. B23k *31/02*
U.S. Cl. 29—477.3                              2 Claims

ABSTRACT OF THE DISCLOSURE

Reinforcing welded pipes or other tubular elements by welding a continuous bead thereon.

BACKGROUND OF THE INVENTION

The present invention relates to a method of reinforcing the walls of welded pipes or other tubular elements which may be produced according to a conventional method by bending a strip of material so as to form a tubular body and by then welding together the adjacent longitudinal or spirally winding edges of this body internally and/or externally so as to form a substantially straight or spirally-shaped seam extending in the longitudinal direction of the tubular body.

Although it is well-known that pipes or other tubular elements which are made of one or more spirally winding strips and are provided with and held together by welded spirally-shaped seams are capable of resisting greater stresses than pipes or other tubular elements which are provided with straight longitudinal seams especially insofar as their resistance to internal pressure as well as to torsion is concerned, it is desirable to improve such tubular elements in a manner so as to be capable of withstanding still higher stresses. It has for this purpose been proposed, for example, by the German Patent No. 1,088,912 to use strips of structural iron or steel of an H, P, U, Y, or Z-shaped cross section as the basic material for producing cylindrical or conical pipes or other tubular elements with welded spirally-shaped seams. Although by employing such a material, the cross-sectional thickness of the wall of the pipe or other tubular element may be considerably increased at and adjacent to its spiral seam or seams, and the tubular element may thereby be considerably solidified, such pipes or other tubular elements cannot be produced by a conventional helical-seam pipe-welding apparatus, but such an apparatus must first be redesigned so as to be in accordance with the particular cross-sectional shape of the material.

SUMMARY OF THE INVENTION

It is an object of the present invention to provide a method of producing strongly reinforced pipes or other tubular elements which are provided with welded seams by means of a conventional pipe-rolling and welding or similar apparatus.

Although this new method is also applicable with very great advantage to the production of pipes and other tubular elements with substantially straight longitudinal welded seams, it is for the reasons as stated above primarily concerned with the production of tubular elements which are provided with spirally winding seams and will therefore be hereafter described with reference to such elements.

For attaining the above-mentioned object, the new method consists in providing the tubular element, which is bent to its tubular shape of a strip of material of a rectangular cross section, with at least one spirally-shaped weld bead either at the time when the edges of the tubular element are welded together or subsequent to this welding operation. Especially if these welded edges and the seam connecting them are spirally-shaped, this weld bead may cover the inner and/or outer welded seam so that substantially the same result will be attained as by producing the pipe or other tubular element of a strip material of a sectional material as described above. It is, however, in this case not required to redesign the entire pipe-rolling and welding apparatus in accordance with the cross-sectional shape of the strip material employed, but only to provide at least one additional welding head which is adapted to weld the additional bead upon the tubular element. It is, however, more advisable to apply this outer weld bead between two adjacent convolutions of the welded spiral seam since this increases the resistance of the tubular element to high stresses. The outer weld bead may be applied so as to extend parallel to the welded seam between the edges of the strip forming the tubular element or it may curve back and forth between adjacent convolutions of the welded seam or seams so as either to touch the seam or to reach points closely adjacent to the seam. This manner of applying the weld bead has the advantage that in the event that a pipe bursts or is torn open, for example, due to an explosion, it will not tear along a line which extends parallel to the welded seam and has a length equal to a multiple of the diameter of the pipe, but such a tear will then end at the next convolutions of the weld bead. The safety and solidity of a pipe or other tubular element may be still further increased if the material of which the weld bead is made differs from and is of a higher quality than the material of which the welded seam is made.

The features and advantages of the present invention will become further apparent from the following detailed description thereof which is to be read with reference to the accompanying diagrammatic drawings, in which:

FIGURE 4 shows an elevation of the tubular piece according to FIGURE 1 after two intersecting wavy weld beads similar to the bead as shown in FIGURE 3 have been applied thereon by moving two additional welding heads back and forth; while

Figure 1:
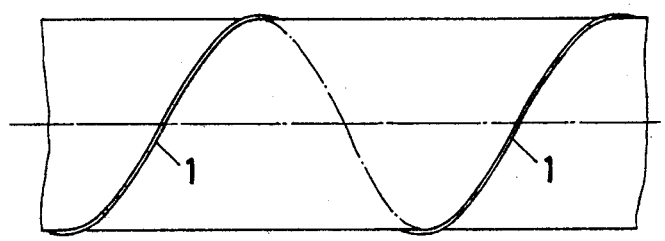
FIGURE 1 shows an elevation of a section of a tubular element which is made of a strip of a rectangular cross section and provided in a conventional manner with a welded spiral seam.

Although as previously stated the present invention is applicable also to pipes and other tubular elements which are provided with a substantially straight longitudinal seam, it will hereafter be described with reference to a spiral-seam pipe or other tubular element, a section of which is illustrated in FIGURE 1 and which is produced in a conventional manner by bending a strip of a rectangular cross section into a spiral shape so as to form a cylinder and by welding together the adjacent edges of the spiral strip. In the particular embodiment as shown in FIGURE 1, it is assumed that the edges are secured to each other at least by an outer welded seam 1. If according to the invention an additional weld bead is applied preferably upon the outside of the tubular element directly above and upon the welded seam 1, the cross-sectional thickness of the seam will be increased by the thickness of the additional weld bead so that the solidity and resistance to internal and torsional stresses of the tubular element will also be increased.

Figure 2:
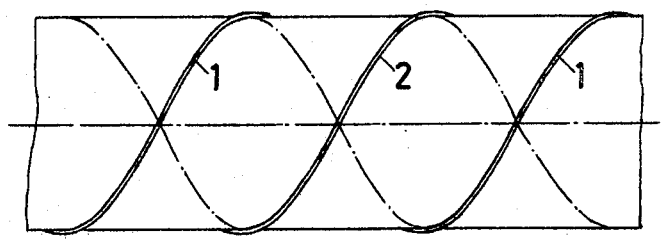
FIGURE 2 shows an elevation of the same tubular piece as shown in FIGURE 1 after a weld bead has been applied thereon which extends parallel to the welded seam.

It is, however, of greater advantage to apply the weld bead 2 between the adjacent convolutions of the welded seam 1 so as to extend parallel to the seam, as illustrated in FIGURE 2. The spirally winding strip forming the wall of the tubular element can then no longer bulge outwardly as easily and as much as this could occur on a tubular element as shown in FIGURE 1 if it is subjected to a very high internal pressure. The additional welding head for producing the weld bead 2 may be mounted in a fixed position in the pipe-rolling and welding apparatus just like the welding head or welding heads which are employed for producing the outer and/or inner welded seams.

Figure 3:
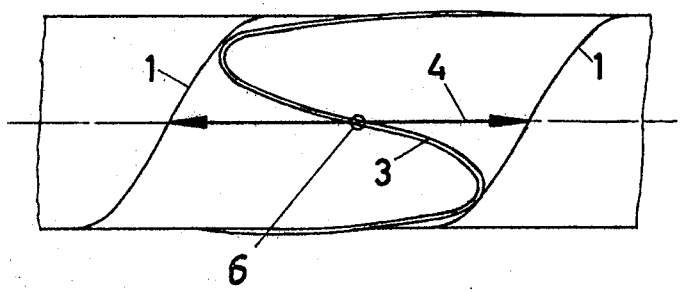
FIGURE 3 shows an elevation of the tubular piece according to FIGURE 1 after a wavy weld bead has been applied thereon which winds back and forth between adjacent convolutions of the welded seam.

If the welding head or heads which are employed for producing the weld bead are moved in a direction parallel to the direction of movement of the pipe or other tubular element, it is possible to produce wavy weld beads 3 as illustrated in FIGURE 3 which curve back and forth between adjacent convolutions of the spiral seam or seams 1 and either touch or even overlap the seam or reach points closely adjacent to the seam. The direction of movement of the welding head 6 which produces the weld bead 3 is indicated in FIGURE 3 by the arrow 4.

Figure 4:
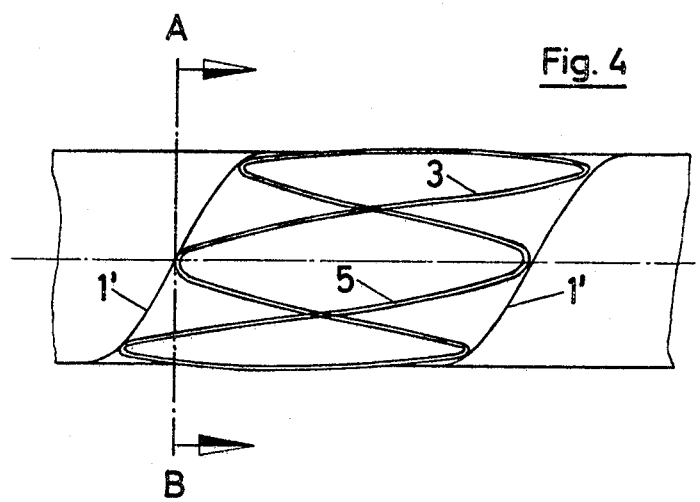
Figure 5:
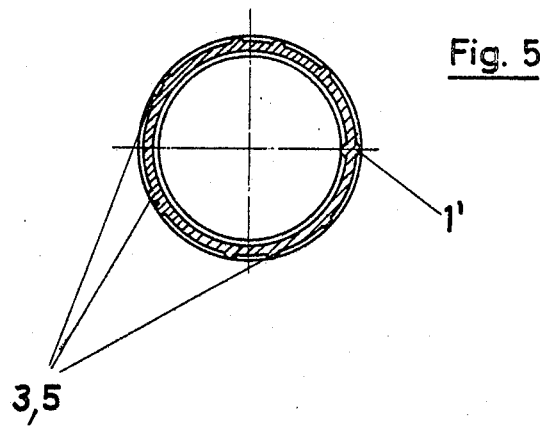
FIGURE 5 shows a cross section which is taken along the line A–B of FIGURE 4.

If two welding heads which are axially offset relative to each other at a distance equal to the width of the strip of which the pipe or other tubular element is made are moved back and forth, for example, along the outside of this element, it is possible to produce two wavy weld beads 3 and 5, as illustrated in FIGURE 4. As will be seen by a cross section of this pipe, as shown in FIGURE 5, in which it is assumed that the pipe is provided with an inner and an outer welded seam 1', the pipe will then be reinforced by weld beads which are spaced at a certain distance from each other.

Of course, the weld beads on any of the embodiments of the invention as shown in the drawings do not merely extend for the distance of one convolution along the pipe or other tubular element, but continuously along the entire length of the element.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of reinforcing the wall of a pipe or other tubular element having at least one welded seam connecting the edges of at least one cylindrically bent strip of material to each other, consisting in welding a continuous bead upon said element, wherein said strip is spirally bent and said welded seam therefore extends spirally in the longitudinal direction of said tubular element, said bead being welded upon said element so as to have a wavy shape curving back and forth between adjacent convolutions of said seams.

2. A method as defined in claim 1, wherein the turns of said wavy bead at least touch the adjacent convolutions of said seam.

References Cited
UNITED STATES PATENTS

| | | | |
|---|---|---|---|
| 1,325,611 | 12/1919 | Baum | 138—153 XR |
| 2,216,606 | 10/1940 | Taylor | 29—477.3 |
| 2,752,873 | 7/1956 | Freeze | 29—477.3 |
| 2,837,626 | 6/1958 | Buck et al. | 29—477.7 XR |
| 3,141,480 | 7/1964 | Ralston | 138—172 |
| 3,314,141 | 3/1967 | Bacroix | 29—477.3 |

JOHN F. CAMPBELL, Primary Examiner

R. B. LAZARUS, Assistant Examiner

U.S. Cl. X.R.

29—477.7; 138—172, 173